March 21, 1939. G. SLAYTER 2,150,945
METHOD AND APPARATUS FOR SPINNING GLASS WOOL
Original Filed March 1, 1934  2 Sheets—Sheet 2
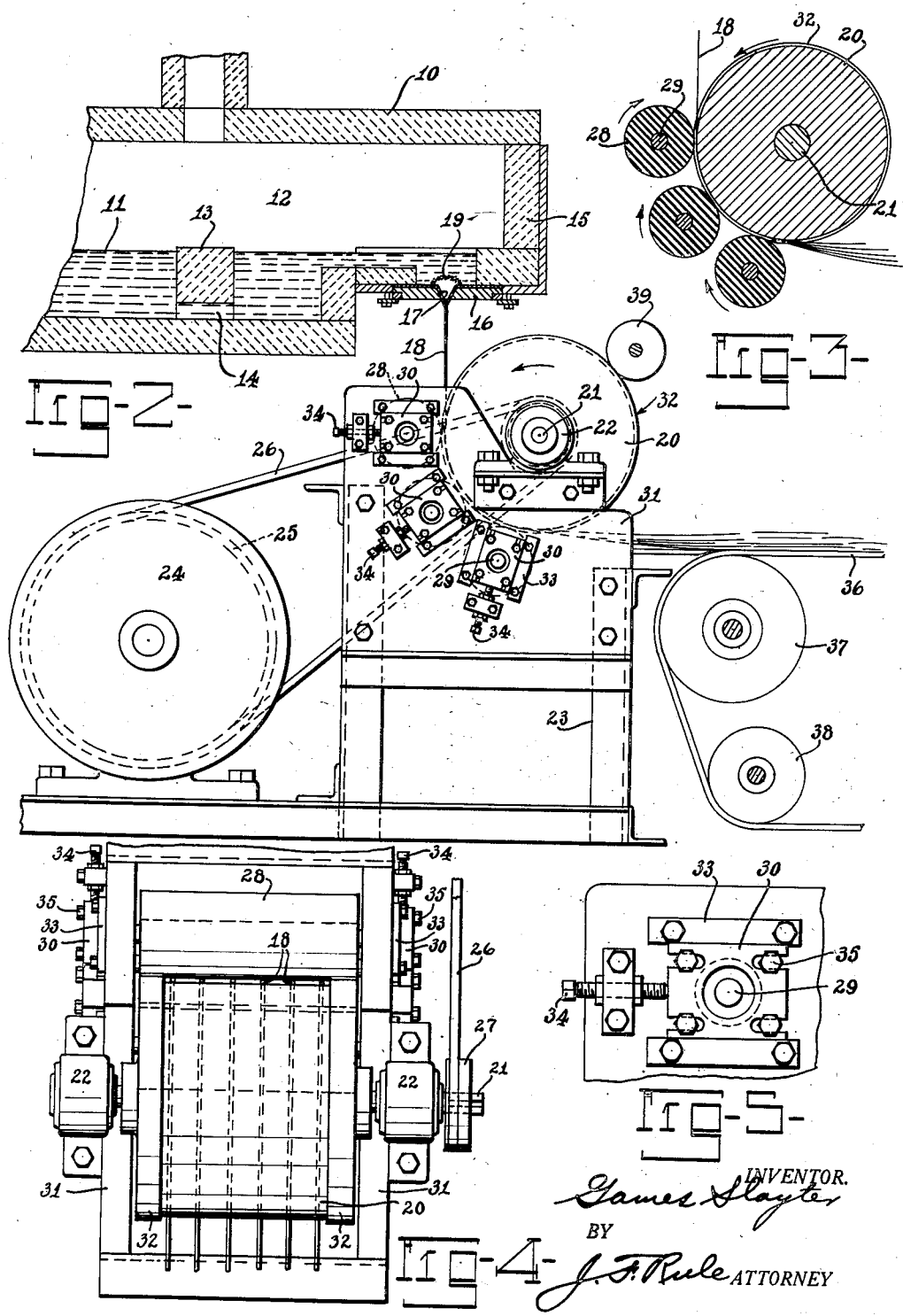
INVENTOR.
James Slayter
BY
J. F. Rule ATTORNEY Patented Mar. 21, 1939

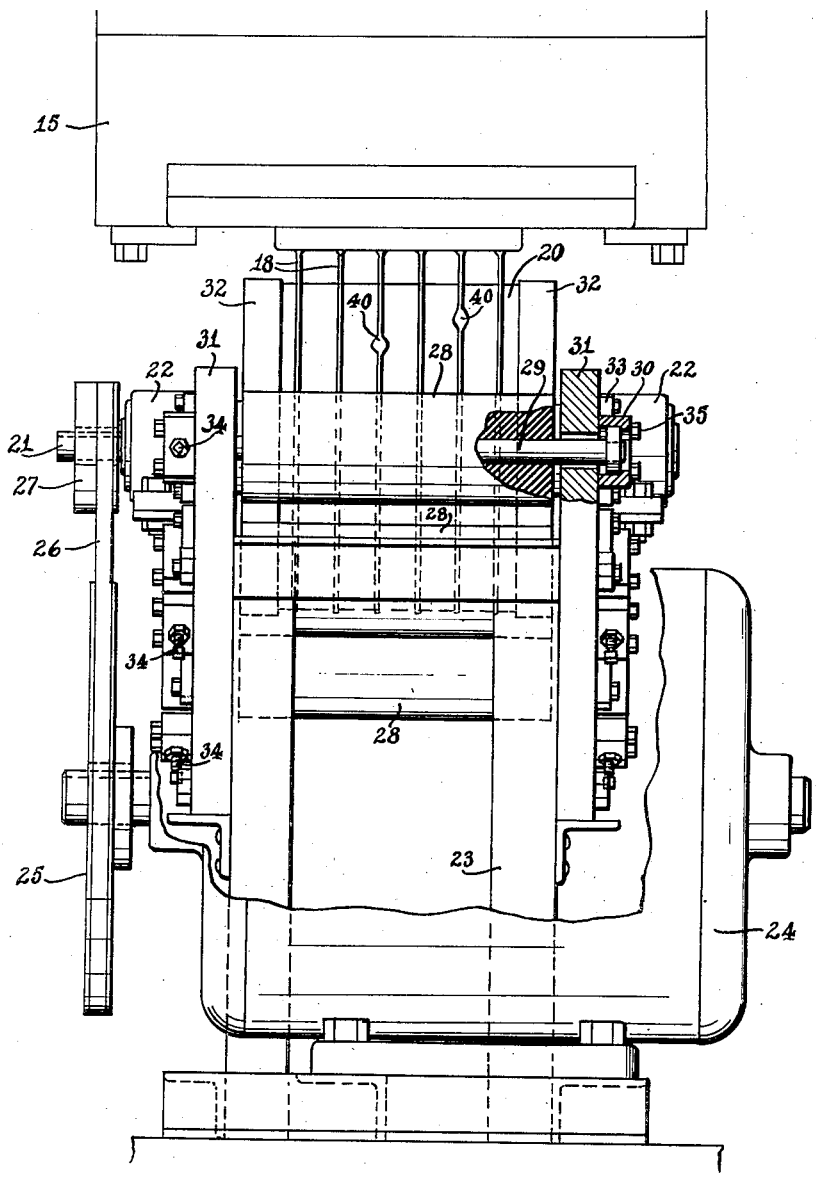

2,150,945

UNITED STATES PATENT OFFICE 2,150,945

METHOD AND APPARATUS FOR SPINNING GLASS WOOL

Games Slayter, Newark, Ohio, assignor, by mesne assignments, to Owens-Corning Fiberglas Corporation, a corporation of Delaware Application March 1, 1934, Serial No. 713,512
Renewed June 3, 1938

17 Claims. (Cl. 83—91)

My invention relates to a method and apparatus for spinning molten glass or other molten, semi-liquid or viscous material.

An object of the invention is to provide an apparatus by which streams of molten glass or other material may be mechanically drawn or spun into fine threads or filaments by a continuous process, the filaments being accumulated in the form of wool.

Heretofore glass wool has been produced by a mechanical process which comprises flowing streams of molten glass, simultaneously drawing the molten or plastic glass into filaments* and winding them onto a rapidly rotating drum, and periodically stopping the drum and removing the accumulated spun glass therefrom. Such intermittent operation is comparatively slow and unsatisfactory for various reasons. An object of the present invention is to avoid the objections and difficulties incident to such operation. For the attainment of such object, the invention provides a continuous method in which the streams of glass are spun or drawn out into fine filaments by a rotating drum but are not accumulated thereon, the spun glass being carried beyond the drum and continuously accumulated in the form of wool.

Heretofore much difficulty has been encountered in the manufacture of wool spun from glass, slag and other materials because of the difficulty of starting the pulling action after the threads break. An object of the present invention is to provide a spinning method and apparatus in which feeding of the material is resumed and driving connections with the spinning element are automatically reestablished after a break in the strand or strands, and also to provide means which will pass any slugs or the like without injuring the apparatus or stopping the process.

Other objects of the invention will appear hereinafter.

Referring to the accompanying drawings:

Fig. 1 is a rear elevation, with parts broken away and parts in section, showing an apparatus constructed in accordance with the present invention.

Fig. 2 is a side elevation of the same, the furnace and feeder being shown in section.

Fig. 3 is a sectional elevation through the spinning drum and cooperating rolls.

Fig. 4 is a fragmentary plan view of the apparatus.

Fig. 5 is a detail view showing an adjustable bearing for one of the rolls.

As herein shown, the invention is adapted for spinning wool from molten glass or the like supplied from a furnace 10 which comprises a melting compartment 11 and a refining compartment 12 separated by a bridge wall 13. The molten glass flows from the melting compartment through a submerged channel 14 into the refining compartment and thence forward into a feeder boot or extension 15. A plate or bushing 16 removably mounted beneath the floor of the feeder boot 15, is provided with outlet openings 17 through which the molten glass issues in the form of small streams which, as they pass beyond the feeder outlets 17 are drawn out into filaments 18. A screen 19 positioned over the outlets serves as a strainer to prevent small stones or other foreign material entering and clogging the outlets.

The apparatus for spinning or drawing the glass into fine threads or filaments, includes a spinning element 20 in the form of a drum having a shaft 21 mounted in bearings 22 on a supporting frame 23. The drum 20 is made of steel or other suitable material and is rotated by an electric motor 24. A drive pulley 25 on the motor shaft has a driving connection with the drum through a belt 26 running over a pulley 27 on the drum shaft.

Cooperating with the drum 20 are rolls 28 carried on shafts 29 journaled to rotate in bearing blocks 30 adjustably mounted on side frame members 31 secured to and forming part of the frame 23. The rolls 28 are made of material which is comparatively soft and yielding, such as rubber, rubber composition or the like. These rolls are in rolling contact with the drum 20 and frictionally driven thereby. As shown, the end portions 32 of the drum may be of slightly greater diameter than the intermediate portions and serve to space the body or intermediate portions of the drum a slight distance from the rolls.

The bearing blocks 30 (see Fig. 5) are slidably supported between guide strips 33 and may be adjusted by adjusting screws 34 for taking up wear and causing the rolls to bear with any desired pressure against the drum 20. The bearing blocks are clamped in their adjusted position by screws 35.

The operation is as follows: The molten glass flows through the outlets 17 in the form of small streams and moves downward into contact with the spinning drum 20 which is continuously rotated at a high speed in a counter-clockwise direction (Figs. 2 and 3), the threads or filaments of glass passing between the drum and the rolls 28. The frictional contact of the glass with the rotating drum causes the glass as it leaves the outlets 17 to be drawn or attenuated into fine filaments which are very rapidly cooled so that they are solidified by the time they have reached the drum 20. These filaments as they pass beyond the lowermost roll 28 leave the surface of the drum and are carried forward and accumulate in the form of wool. The driving flanges 32 impart to the rolls 28 a somewhat higher surface speed than that of the drum surface with which the strands 18 contact. This assists in guiding the strands in their normal course around the drum. The accumulating wool may be conveyed away from the spinning apparatus as by means of a continuously traveling conveyor 36 running over rolls 37 and 38.

If desired, a roll 39 or rolls may be provided to run in contact with the drum for feeding thereto a tempering oil, lubricating material or other substance with which it may be desired to treat the wool. Such material is in turn applied by the drum to the strands 18 passing thereover. The roll 39 is preferably soft and resilient and consists of a material which will not be injuriously affected by the oil or other substance fed thereby. The roll 39 operates in a manner similar to inking rolls commonly used on printing presses. If slugs 40 (Fig. 1), bubbles or other irregularities are carried with the streams or filaments of glass to the spinning drum they are rolled out due to the resilience of the rolls, thus avoiding any stoppage.

The number of outlets 17 supplied by the feeder may be varied as desired. The diameters of the fibers of wool produced by the method herein set forth may be adjustably varied and controlled by varying the speed at which the spinning drum 20 is rotated, by varying the size of the outlets 17, and by varying the temperature and viscosity of the glass. An increase in the speed of the drum serves to draw the filaments out to a smaller diameter. Any reduction in the size of the outlets 17 and the streams of glass flowing therethrough correspondingly reduces the size of the filaments. Reduction in the temperature of the issuing glass increases its viscosity and slows down the rate of flow with a consequent reduction in the size of the filaments. The size of the filaments or the fineness of the wool and other properties thereof may be varied by changes in the formula of the glass batch.

Modifications may be resorted to within the spirit and scope of my invention.

I claim:

1. The method which comprises flowing a small stream of molten or viscous material through space, bringing said material in filamentary form into contact at a tangent with a cylindrical surface rotating at a high speed about a stationary axis, causing said material to advance in the form of a filament over said surface in frictional contact therewith and continuously drawing out or attenuating the material in its passage through space by the pull of the said surface, and causing the attenuated material to depart in the form of a filament from said surface in a direction tangential thereto.

2. The method which comprises flowing a small stream of molten or viscous material through space, bringing said material in filamentary form into contact at a tangent with a cylindrical surface rotating at a high speed about a stationary axis, causing said material to advance in the form of a filament over said surface in frictional contact therewith and continuously drawing out or attenuating the material in its passage through space by the pull of the said surface, and causing the attenuated material to depart in the form of a filament from said surface in a direction tangential thereto after moving with said surface through a fraction only of a complete revolution about said axis.

3. Apparatus for spinning wool, which comprises means for flowing a stream of molten or viscous material, a spinning element having a cylindrical surface in position to contact said stream, means to rotate said element at a high velocity about a horizontal axis, and means to deflect and guide the material along and in frictional contact with said surface and thereby cause said surface to frictionally engage said flowing material and draw it into an attenuated thread.

4. Apparatus for spinning wool, which comprises means for flowing a stream of molten or viscous material, a spinning element having a cylindrical surface in position to contact said stream, means to rotate said element at a high velocity about a horizontal axis, means to deflect and guide the material along and in frictional contact with said surface and thereby cause said surface to frictionally engage said flowing material and draw it into an attenuated thread, and means for receiving said thread and accumulating it in the form of wool.

5. Apparatus for spinning wool from a viscous material, which comprises means for flowing said material in the form of a small stream, a spinning drum, means for rotating the drum at a high velocity and causing it to frictionally engage and draw said material out into a fine thread or filament, a roll parallel with said drum and having its peripheral surface spaced a short distance from that of the drum by raised portions at the ends of the drum to provide a narrow space through which said material passes while in contact with the drum, and means to rotate said roll.

6. Apparatus for spinning wool from a viscous material, which comprises means for flowing said material in the form of a small stream, a spinning drum means for rotating the drum at a high velocity and causing it to frictionally engage and draw said material out into a fine thread or filament, a roll parallel with said drum and having its peripheral surface spaced a short distance from that of the drum to provide a narrow space through which said material passes while in contact with the drum, and means to rotate said roll, the surface of said drum consisting of hard material and the surface of said roll consisting of comparatively soft resilient material.

7. Apparatus for spinning wool from a molten or plastic material comprising, in combination, means for flowing a stream of the material, a spinning drum having its peripheral surface of hard material, a roll of soft material parallel therewith, and means for rotating said drum and roll at high speed in opposite directions, the surfaces of the drum and roll being spaced to provide a narrow passageway through which said material is drawn.

8. A container for molten glass having a row of bottom outlets through which the glass issues, a spinning drum positioned beneath said outlets with its surface substantially tangent to the vertical plane of said outlets, means for rotating said drum at a high velocity, and means for causing streams of the material issuing from said outlets to contact with the surface of the drum and be deflected from a vertical to a substantially horizontal direction of movement while in contact with said surface, said deflecting means constructed and arranged to cause the material to remain in contact with said surface for a fraction only of a revolution of the drum and to be frictionally drawn by the drum into attenuated filaments.

9. The combination of means for producing a stream of molten or viscous material, a spinning drum, means to rotate it at a high speed about a horizontal axis, said drum positioned with its downwardly moving surface below and substantially tangent to the flowing stream, a series of rolls parallel with the drum and positioned one in advance of another circumferentially of the drum, with their peripheral surfaces adjacent to that of the drum, and means for rotating said rolls at a high velocity.

10. The combination of means for producing a stream of molten or viscous material, a spinning drum, means to rotate it at a high speed about a horizontal axis, said drum positioned with its downwardly moving surface below and substantially tangent to the flowing stream, a series of rolls parallel with the drum and positioned one in advance of another circumferentially of the drum, with their peripheral surfaces adjacent to that of the drum, and means for rotating said rolls at a high velocity, the surface of said drum consisting of hard material and the cooperating surfaces of said rolls consisting of soft resilient material.

11. The combination of a container for molten glass having a row of bottom outlet openings through which the glass issues downwardly, a spinning drum positioned below said outlets, means for rotating said drum at a high velocity about a horizontal axis, the downwardly moving surface of said drum being substantially tangent with the vertical plane of said row of outlet openings, means for maintaining frictional contact between said drum and the flowing material and cause the drum to draw said material into attenuated filaments, and means for continuously receiving and conveying said filaments away from the drum.

12. The combination of a container for molten glass having a row of bottom outlet openings through which the glass issues downwardly, a spinning drum positioned below said outlets, means for rotating said drum at a high velocity about a horizontal axis, the downwardly moving surface of said drum being substantially tangent with the vertical plane of said row of outlet openings, said drum operative to frictionally engage the flowing material and draw it into attenuated filaments, means for continuously receiving and conveying said filaments away from the drum, and a series of rubber rolls having peripheral portions in contact with the rotating surface of the drum and causing the rolls to be rotated thereby, the surfaces of said rolls being spaced from the surface portions of the drum with which the said material contacts to provide narrow passageways between the drum and rolls through which said filaments are conducted.

13. The combination of means for producing a stream of molten or viscous material, a spinning drum, means to rotate it at a high speed about a horizontal axis, said drum positioned with its downwardly moving surface below the flowing stream, and a series of rolls parallel with the drum and positioned one in advance of another circumferentially of the drum, the drum having peripheral enlargements frictionally engaging and driving the rolls and providing narrow spaces between the drum and rolls through which said material is drawn.

14. The method of producing fibrous material which comprises, causing molten or viscous material to issue from a supply body in the form of a small stream, causing the material to continuously advance through a predetermined space in the form of a thin stream, directing the material in a curved path tangential to and forming a continuation of the path of the material through said predetermined space, applying to said material at points distributed along said curved path, a drawing force by which tension is applied to the portion of said material which is moving through said space and thereby continuously drawing it out to an attenuated filament, and releasing the filament from said tension and causing it to move freely through space as it passes beyond the drawing point.

15. The method of producing fibrous material which comprises, causing molten or viscous material to issue from a supply body in the form of a small stream, causing the material to continuously advance through a predetermined space in the form of a thin stream, directing the material in a curved path tangential to and forming a continuation of the path of the material through said predetermined space, applying to said material at points distributed along said curved path, a drawing force by which tension is applied to the portion of said material which is moving through said space and thereby continuously drawing it out to an attenuated filament, releasing the filament from said tension and causing it to move freely through space as it passes beyond the drawing point and causing the filament to solidify while still integrally united with the supply body and oncoming stream.

16. The method which comprises producing a stream of viscous material, extending the material in stream formation through space to a surface moving at a high speed, causing the material to move continuously forward without appreciable lateral movement over said surface in a plane of said stream and in momentary frictional contact with the said surface, drawing and attenuating the material into a fine filament by the pull of said surface thereon and causing the material to solidify during its movement toward said surface, and causing the filament while still integral with said stream to continuously move beyond said surface and in said plane.

17. The method which comprises flowing an uninterrupted stream of molten material through a bottom outlet in a container, rotating at a high velocity a surface spaced from said outlet, causing said stream to contact with said surface and to be frictionally drawn thereby into an attenuated filament during its movement through space, and causing the filament to be continuously carried away from said surface and to solidify while still integrally united with the stream at said outlet, and maintaining the flowing material in substantially a single plane and moving continuously forward without appreciable lateral movement throughout its flowing movement and transition to an attenuated solid filament.

GAMES SLAYTER.